Dec. 26, 1939.  W. L. HANSEN  2,184,669
GEAR CASING
Filed Sept. 9, 1936
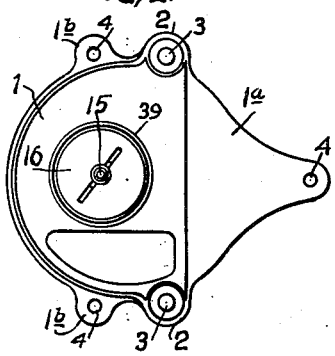
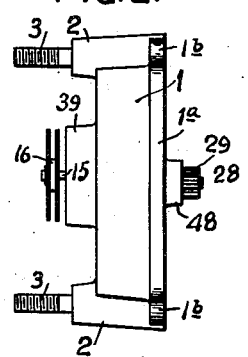
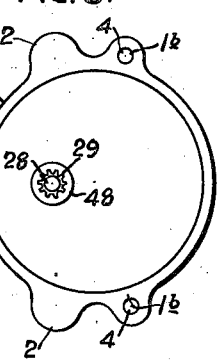
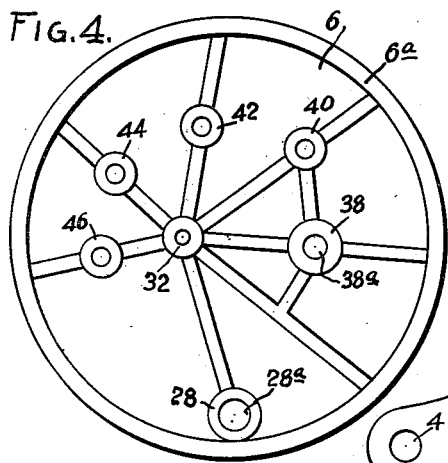
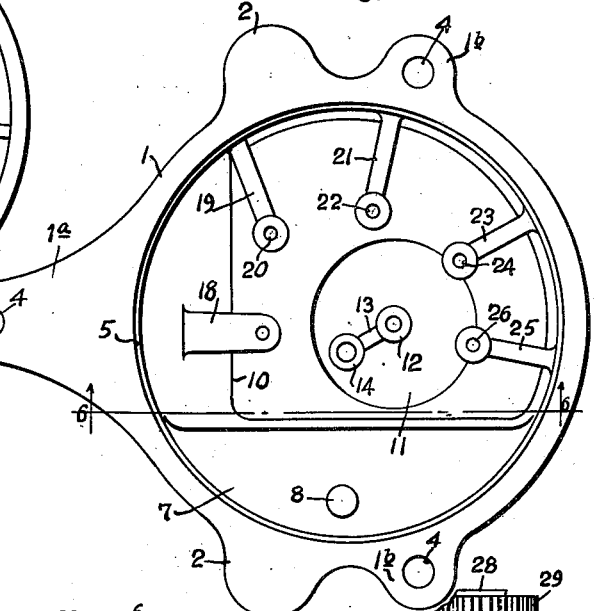
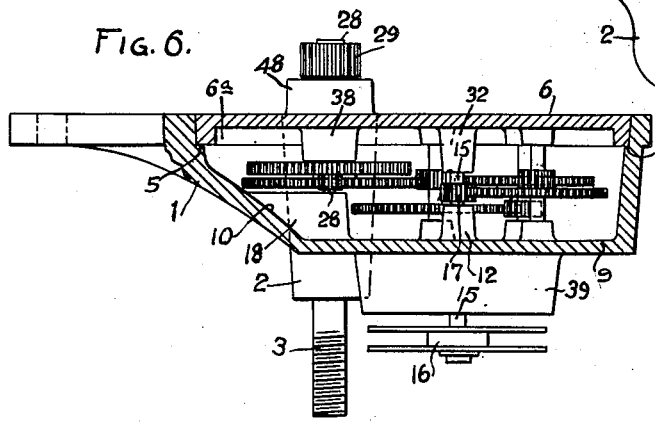
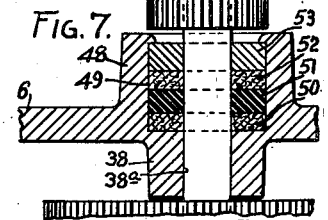
Inventor
WILLIAM L. HANSEN,
BY
Attorneys Patented Dec. 26, 1939

2,184,669

UNITED STATES PATENT OFFICE 2,184,669

GEAR CASING

William L. Hansen, Princeton, Ind., assignor to Hansen Mfg. Company, Inc., Princeton, Ind., a corporation of Indiana Application September 9, 1936, Serial No. 100,027

1 Claim. (Cl. 74—606)

This invention relates to gear casings and particularly to casings for speed reduction units.

It is an object of this invention to provide a casing for gearing of a synchronous or other electric motor, which is substantially dust-proof.

It is a further object of this invention to provide such a casing which is of simple construction, which is composed of two parts and which casing has integrally cast therewith a pair of magnet field plate supporting bolts.

It is a further object of this invention to provide such a casing which is particularly adapted to be attached at three points to a suitable casing support.

It is a further object of this invention to provide such a casing having integral means for supporting the magnet field plates and coil at the rear thereof and which is provided with internal strengthening means and bearing members integrally formed therein.

It is a further object of this invention to provide such a casing comprising a body casting and a circular cover plate which is adapted for sealing engagement with the body casting.

It is a further object of this invention to provide in such a construction means comprising a pilot pin and a complementary socket adapted to properly locate the cover plate with respect to the body casting so that cooperating bearing members will be disposed in alignment.

It is a further object of this invention to provide such a construction adapted for hermetical sealing of the cover plate upon the casting by means of solder, cement or the like.

It is a further object of this invention to provide such a construction in which a sealed chamber is formed for enclosing the gearing whereby the only means of communication between the chamber and the exterior is through the 1 R. P. M. arbor and the rotor shaft.

It is a further object of this invention to provide such a construction in which a substantially dust-proof chamber is provided for enclosure of the gearing.

It is a further object of this invention to provide sealing means for the 1 R. P. M. arbor bearing which is particularly adapted to prevent the escape of oil from the casing chamber to the exterior.

These and other objects and advantages will appear from the following description taken in connection with the drawing.

In the drawing:

Figure 1 is a plan view of the rear of the casing;

Figure 2 is a side elevational view of the casing, as seen from the left of Figure 1, looking toward the right;

Figure 3 is a plan view of the front of the casing;

Figure 4 is a plan view of the inside of the cover plate of the casing;

Figure 5 is a plan view of the interior of the casing with the cover plate gearing and gearing shafts removed for the sake of clearness;

Figure 6 is an elevational view, in section, taken on the line 6—6 of Figure 5, showing the shafts and gearing located in the casing; and Figure 7 is a sectional view showing the construction of the oil seal and the 1 R. P. M. bearing construction.

Referring to the drawing in particular, the body or body casting 1 of the casing is provided with bosses 2 which extend rearwardly and which have the field plate supporting bolts 3 integrally secured therein. A reduced extension 1a extends outwardly from the main part of the body and is provided at its end with a hole or aperture 4. Ears 1b, also provided with holes or apertures 4, extend outwardly from the top of the casting. The apertures 4 are disposed at 120 degrees with respect to one another whereby to provide three-point suspension of the casing to a suitable support. The upper interior margin or aperture of the body 1 is circular and is conically tapered and is provided with an annular flange or step 5 adapted to support the correspondingly tapered annular marginal flange of the cover plate 6 (Figure 6).

At one side the body is provided with interiorly disposed raised wall or step 7 having the pilot pin 8 thereon. This pilot pin 8 is in the form of a dowel pin adapted to engage a socket in the inner surface of the cover plate 6 to align the cover plate 6 and the body 1. The rear wall 9 of the body has extending from one side thereof the inclined wall 10 which extends toward the extension 1a and terminates adjacent the step 5.

Disposed substantially centrally of the rear wall 9 is a substantially circular countersunk portion 11. Extending upwardly from the rear inner wall of the countersunk portion 11 is the rotor bearing boss 12 which is connected by means of web 13 with an apertured ventilation boss 14. The rotor bearing boss 12 is suitably bored to rotatably accommodate the rotor shaft 15 having attached at its outward end the rotor 16 and having the rotor pinion 17 attached to its inner end portion adjacent the rotor bearing boss 12.

Extending radially, inwardly and upwardly of the inclined wall surface 10 and adjacent the rear wall 9 is a bearing boss 18 which is provided with suitable thrust bearing surface for supporting a shaft of the gear train. Also extending radially, inwardly and upwardly from the side and inner back wall of the gear chamber are the web 19 having formed therein the thrust member 20, the web 21 having formed therein the thrust bearing surface 22, the web 23 having formed therein the thrust bearing surface 24 and the web 25 having formed therein the thrust bearing surface 26. The bearing surface formed in the boss 18 is adapted to support the rearwardly disposed end of the 1 R. P. M. shaft 28.

The upper end of the rotor shaft 15 is supported by the thrust bearing surface of a boss 32 disposed oppositely or in registration with the bearing boss 12 when the cover plate 6 is properly seated on the step 5 in the body 1.

When the cover plate 6 is properly disposed with its annular marginal flange 6a supported on the step 5, the pilot pin 8 is engaged in the socket 28a of the boss 28 on the cover plate. The end thrust bearing in the boss 40 is disposed opposite the thrust bearing means in the boss 20, the thrust bearing means in the boss 42 is disposed opposite the thrust bearing means in the boss 22, the thrust bearing means in the boss 44 is disposed opposite the thrust bearing means in the boss 24 and the thrust bearing means in the boss 46 is disposed opposite the thrust bearing means in the boss 26. An aperture 38a in the boss 38, opposite the boss 18, is disposed in registry with the thrust bearing means in the bearing boss 18. This aperture 38a is adapted to accommodate the forward end portion of the 1 R. P. M. shaft 28, as will be hereinafter more clearly described.

An inwardly extending radial web extends from the annular flange 6a inwardly to connect the boss 46 with the boss 32. A like web connects the boss 44 with the boss 32 and like webs connect the bosses 42, 40 and 38 to the boss 32. A straight web connects the boss 40 with the boss 38 and the web which connects the boss 44 with the boss 32 extends from the boss 32 to the flange 6a and is connected by a straight web to the boss 38. This construction of webs substantially increases the rigidity of the bearing support whereby to prevent misalignment and/or vibration of the gear shafts supported thereby. When the socket 28a is engaged with the pilot pin 8, due to the circular construction of the cover plate 6, the respective complementary thrust bearing surfaces must, of necessity, be in registration. This is an important feature of this invention.

Surrounding the rotor shaft 15, where it projects outside the rear wall 9 of the casing, is an annular wall 39 which tapers outwardly to provide means for aligning the field provided by magnetic field plates which are adapted to be supported upon the field plate supporting bolts 3. On the top or outer surface of the cover plate 6 is a boss 48 which has therein an enlarged bore 49 which is coaxial with the aperture 38a in the boss 38. Disposed in this bore 49, about the 1 R. P. M. shaft 28 which extends therethrough, is a seal comprising a leather washer 50, a rubber washer 51 and a second leather washer 52. A metallic washer 53 is disposed outwardly of the seal comprising the washers 50, 51 and 52. The outer inward edge of the boss 48 is upset whereby to secure the metallic washer 53 and the sealing washers 50, 51 and 52 in the bore 49.

At the extreme outer end of the 1 R. P. M. shaft 28 is the 1 R. P. M. pinion 29 which is rigidly secured to the 1 R. P. M. shaft 28. Formerly, due to the vulnerability of rubber to attack of oil, it was impossible to utilize the desirable properties of rubber in bearing packing. By the use of a packing comprising a rubber washer having a leather washer at each side thereof, I am enabled to utilize, to the fullest, the sealing properties of rubber in this connection. Upon the beginning of dissolution of rubber by oil, in the packing of my invention, the dissolved rubber is collected by the fibers of the leather washers, whereby to make a perfect seal. I have thus utilized a former disadvantage to produce an entirely new result. A packing made according to the principles of my invention will wear substantially longer, will provide a tighter seal and will produce less resistance to rotation of the shaft mounted therein than is true of known constructions.

By the placement of the thrust bearing surfaces on substantially radially disposed webs, I am enabled to achieve the strongest possible construction providing the utmost rigidity and freedom from vibration which is possible for a given weight. Likewise, by the utilization of the annular rearwardly projecting wall 39, I am enabled to provide a better field alignment than is possible with other known constructions. Furthermore, the use of the circular cover plate in connection with the complementary pilot pin and socket makes it impossible for the respective complementary bearings to be displaced. Furthermore, the cover plate may be hermetically sealed to the body casting by means of welding, soldering or the use of suitable cement. When the cover plate is so hermetically sealed to the body casting, the entry of dust to the hermetically sealed gearing chamber is prevented and the escape of oil is substantially reduced by the casting of the thrust bearing surfaces into the rear wall and cover plate of the casing. The only exposed shafts are the rotor shaft and the 1 R. P. M. shaft. The 1 R. P. M. shaft is provided with above described packing which prevents the escape of oil from the chamber and likewise prevents the entry of dust and/or other foreign material into the chamber.

When rubber is attacked by oil, it is subjected to a swelling action. This tends to tighten the packing made according to the principles of my invention. As the rubber is reduced by attack of oil, this swelling effect compensates for the rubber loss. The rubber lost from the rubber washer is deposited in the fibers of the adjacent leather washers and thus the thickness of the packing is substantially uniform irrespective of age and/or attack of oil.

It will be understood that the above described structure is merely illustrative of one manner in which the principles of my invention may be carried out and that I desire to comprehend within my invention such modifications as come within the scope of the claim and the invention.

Having thus fully described my invention, what I claim as new and desire to secure by Letters Patent is:

A casing for a speed reduction unit having intermeshing gears supported on shafts comprising a cupped body member having a bottom with shaft bearing recesses, said body member having a circular aperture with a conical tapering wall, a mating circular cover member of substantially the same diameter as said aperture having a correspondingly tapered rim mating with said conical tapering wall and closely insertible therein and having shaft bearing recesses alignable with and corresponding to the shaft bearing recesses in said body member, one of said members having an aligning socket and the other member having an aligning pin closely fitting said socket in the aligned positions of said shaft bearing recesses in said body member and cover member, whereby to align the bearing recesses of said body member with the bearing recesses of said cover member when said cover member is inserted in the circular aperture of said body member and rotated until said pin enters said socket, and means independent of said aligning pin and socket for securing said cover member to said body member.

WILLIAM L. HANSEN.